US011730647B2

(12) United States Patent
Knopf

(10) Patent No.: US 11,730,647 B2
(45) Date of Patent: Aug. 22, 2023

(54) BACKREST ASSEMBLY AND WHEELCHAIR THEREWITH

(71) Applicant: Sunrise Medical GmbH, Malsch / Heidelberg (DE)

(72) Inventor: Michael Knopf, Kaiserslautern (DE)

(73) Assignee: Sunrise Medical (US) LLC, Fresno, CA (US)

( * ) Notice: Subject to any disclaimer, the term of this patent is extended or adjusted under 35 U.S.C. 154(b) by 816 days.

(21) Appl. No.: 16/430,579

(22) Filed: Jun. 4, 2019

(65) Prior Publication Data

US 2019/0365584 A1 Dec. 5, 2019

(30) Foreign Application Priority Data

Jun. 5, 2018 (DE) .......................... 102018113346.4

(51) Int. Cl.
*A61G 5/10* (2006.01)
*A61G 5/12* (2006.01)
*F16C 1/10* (2006.01)

(52) U.S. Cl.
CPC .............. *A61G 5/10* (2013.01); *A61G 5/122* (2016.11); *F16C 1/10* (2013.01)

(58) Field of Classification Search
CPC ........ A61G 5/10; A61G 5/122; A61G 5/1067; A61G 5/0866; F16C 1/10
(Continued)

(56) References Cited

U.S. PATENT DOCUMENTS 6,799,770 B2   10/2004  Patrick et al.
7,100,988 B1*  9/2006   Hyslop ................. A47D 1/008
                                                           297/376
(Continued)

FOREIGN PATENT DOCUMENTS

DE     10161624 C1    11/2002
EP      2039334 A2     3/2009
(Continued)

OTHER PUBLICATIONS

German Office Action, DE102018113346.4, dated Nov. 28, 2018.
(Continued)

*Primary Examiner* — Minnah L Seoh
*Assistant Examiner* — Felicia L. Brittman
(74) *Attorney, Agent, or Firm* — MacMillan, Sobanski & Todd, LLC

(57) ABSTRACT

A backrest assembly of a wheelchair seat has a tubular seating frame. The backrest assembly includes a backrest, two hollow backrest tubes connecting the backrest to the seat, and at least two joints allowing movement of the backrest tubes between at least first and second end positions. Two locking means are provided for locking and/or unlocking the joints. A hollow handle tube has a single handle for effecting the locking means which is arranged between the backrest tubes and mechanically connected to the locking means via cables. The handle further effects movement of the backrest tubes, via the joints, with use of one hand in constant grip of the handle. The handle is actuated by at least partly sliding, rotating, squeezing, pushing and/or pulling. The locking means automatically re-locks after unlocking and reaching the first or second end positions.

20 Claims, 10 Drawing Sheets

(58) Field of Classification Search
USPC .................................................... 280/304.1
See application file for complete search history.

(56) References Cited

U.S. PATENT DOCUMENTS

2006/0232039 A1   10/2006  Kao
2019/0247249 A1    8/2019  Hildebrand et al.

FOREIGN PATENT DOCUMENTS

| | | |
|---|---|---|
| FR | 2845893 A1 | 4/2004 |
| RU | 2691850 C1 * | 6/2019 |
| WO | 2017202745 A1 | 11/2017 |

OTHER PUBLICATIONS

EPO machine translation of DE10161624.
EPO machine translation of FR2845893.
European Extended Search Report, Application No. 19176813.4, dated Oct. 30, 2019.

* cited by examiner

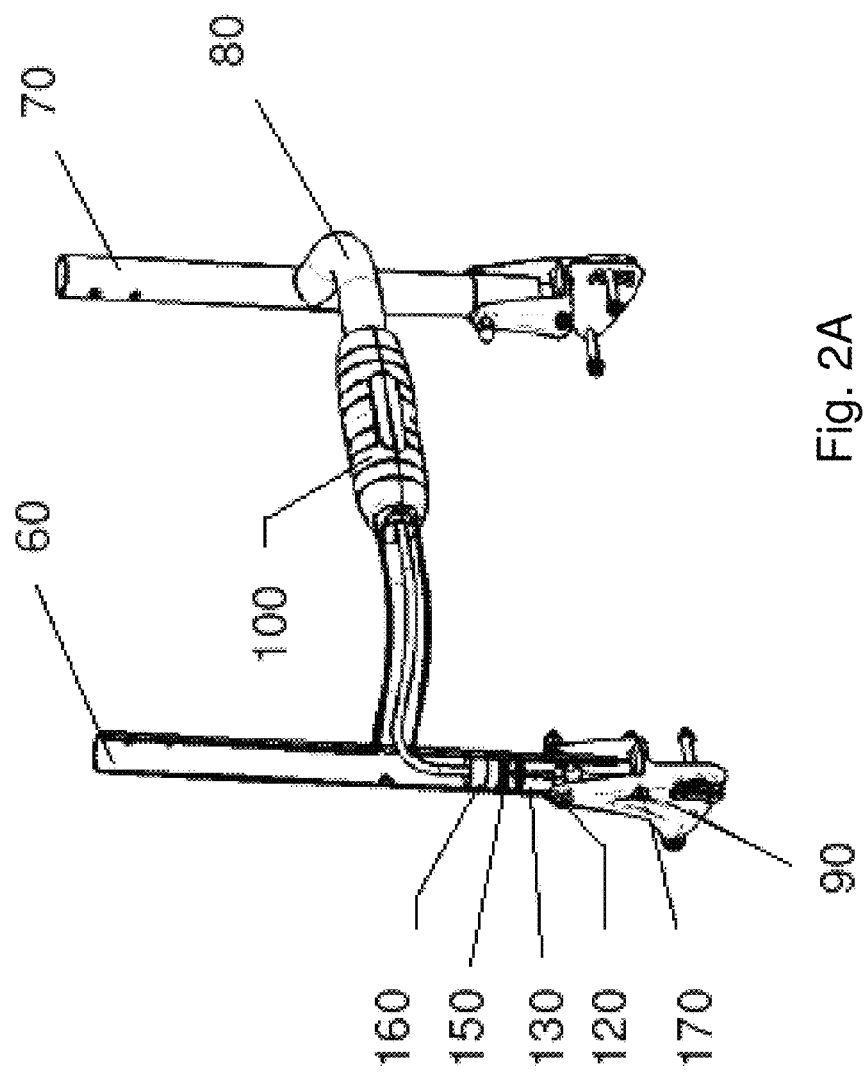

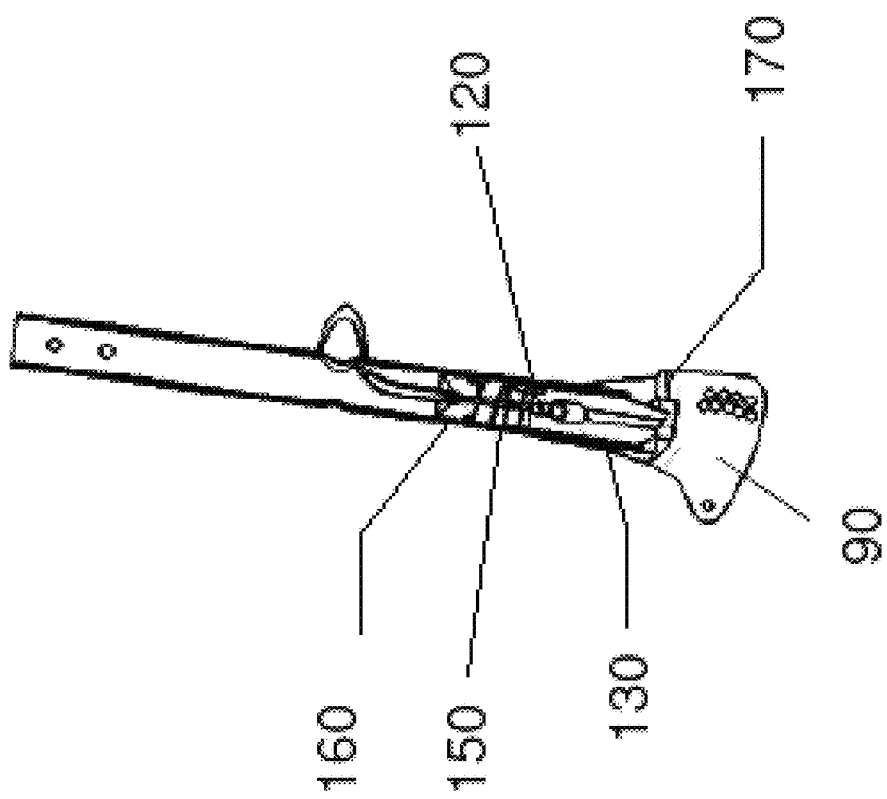

BACKREST ASSEMBLY AND WHEELCHAIR THEREWITH

CROSS-REFERENCE TO RELATED APPLICATIONS

This application claims priority from German Patent Application No. 102018113346.4, filed on Jun. 5, 2018, the disclosure of which is incorporated herein by reference in its entirety.

BACKGROUND OF THE INVENTION

This invention relates in general to wheelchairs and, in particular, to a backrest assembly for a chair and a wheelchair with such a backrest assembly.

A chair typically comprises a frame that supports a seat having a seating surface and a backrest, and a plurality of legs. A wheelchair is a type of chair for allowing the locomotion of a person while this person uses the chair. For this the legs of the chair are typically configured as wheels, with a standard type comprising four wheels, wherein two wheels are typically configured as drive wheels. A chair, in particular a wheelchair, often incorporates folding functions that allow the overall size of the chair frame to be reduced in order to store or transport the unoccupied chair. There are wheelchairs which have backrests that fold down against the seating surface to reduce the overall size of the frame.

U.S. Pat. No. 5,364,165 discloses a latch assembly for a wheelchair apparatus including a movable frame member mounted to a stationary frame member for movement between a deployed position and a moved position. The latch assembly comprises a bolt, a base member, a biasing device, and a retaining mechanism. The bolt is mounted for sliding movement to one of said movable frame member and said stationary frame member and has a first surface. The base member is mounted to the other of said movable frame member and said stationary frame member and has a second surface. One of said bolt and said base member is manually movable between a latched position and a released position. In the latched position said first surface is oriented in an aligned orientation and in cooperative engagement with said second surface to releasably latch said movable frame member to said stationary frame member in said deployed position and in the released position said first surface is disengaged from said second surface such that said movable frame member is free to move from said deployed position to said moved position. The biasing device is biasing one of said bolt and said base towards said latched position and the retaining mechanism is stably retaining one of said bolt and said base in said released position, while said movable frame member is maintained in said deployed position, with said first surface out of engagement with said second surface upon manual release of said bolt. One of said bolt and said base is further mounted and biased by said biasing device for automatic movement back to said aligned orientation upon movement of said movable frame member from said deployed position to said moved position. Therefore U.S. Pat. No. 5,364,165 discloses the possibility to consecutively release two bolts from the backrest latch and then effect the backrest folding operation. Although this can be done using only one hand, the user still has to use three hand movements engaging different parts in order to complete the backrest folding.

U.S. Pat. No. 7,377,588 B2 discloses a seating system comprising a mount for securing a backrest to a frame, wherein the mount comprises two or more mating members. At least one of the mating members has a generally curved radial surface that is engageable with the other mating members to lock together the backrest with respect to frame. Here, a cord is secured between plunger pins on the left and right-hand sides of the backrest. To fold the backrest the user applies a rearward force to the retraction cord which simultaneously disengages both plunger pins and allows a rotation of the backrest. However, having a cord may increase the risk of entrapment and loosening the backrest in a uncontrolled and unwanted manner.

DE 101 61 624 C1 describes a wheelchair which comprises a chassis, seat, back rest, arm rests, at least one adjusting device for adjusting at least one seat part which is then fixed in the desired position by a locking device, and a handle fixed to the back rest. The handle has a rotating part rotating about the handle axis whose rotational movement is transferred by a Bowden cable to the adjusting device. Rotation of the rotating part in one direction releases the locking device and rotation in the opposite direction locks the locking device. The locking device is pre-tensioned in the locked position.

A wheelchair known from FR 2 845 893 A1 has a frame with rear and front wheels and handles, and a seat back that can be set at a variable angle to the seat. The seat back has side tubes with their lower ends pivoted in supports and fitted with locks in the form of spring-loaded elements with transverse rods inside the side tubes that engage with selected notches in the supports. The spring-loaded elements are connected by cables inside the tubes to triggers on the handles that release the locks for adjustment of the back position.

EP 2 039 334 A2 relates to a wheelchair, comprising a frame, a tiltable seat operatively connected to said frame, said seat having a back member connected to a bottom member, and a curvilinear support member connected to said seat bottom member and operatively and movably engaging in said frame. A gear rack is connected to said frame, said gear rack operatively connected to said seat for controlling the tilting of said seat, whereby said curvilinear support member has a center region spaced apart from and located above said frame about which said seat tilts.

A wheelchair disclosed in US 2006/9232039 A1 includes a back support pivotally attached to a base frame and having a handle and a hand grip pivotally attached to the handle, a housing is secured to the base frame and includes a chamber to slidably receive a shank which has one end pivotally attached to the back support. An adjustably anchoring device may be used to adjustably anchor the shank to the housing, and to adjustably secure the back support to the base frame to selected angular position. One or more coil springs are engaged onto the shank, and have an inner diameter smaller than an outer diameter of the shank, to allow the springs to be engaged and clamped onto the shank, and to be expanded and released from the shank by a barrel.

U.S. Pat. No. 6,799,770 B2 relates to a wheelchair that provides for efficient, safe transfer of a patient from the wheelchair to a bed or from a bed to the wheelchair. The wheelchair may be locked to a bed using small wheels attached to the wheelchair, that engages a track mounted onto the bed.

For the user of a wheelchair, physically impaired people having need of the wheelchair, and for people taking care of them, it is of great importance to ease daily struggles, simplify functions and at the same time to increase the safety of the used devices. Especially for people having difficulties in the lower body, the simultaneous usage of two hands for folding the backrest of a chair, in particular a wheelchair, is a challenging task since they often need to stabilize their upper torso with one hand.

It would be desirable to provide a backrest assembly with an easy and safe one-handed mechanism to unlock and fold or unfold the backrest with a single grip.

SUMMARY OF THE INVENTION

This invention relates in general to wheelchairs and, in particular, to a backrest assembly for a chair and a wheelchair with such a backrest assembly.

The invention described herein includes a backrest assembly of a seat of a chair, in particular a wheelchair, having a seating frame comprising tubes, with the backrest assembly comprising: a backrest for supporting the back of a person; two hollow backrest tubes connecting the backrest to the seat on each side of the seat; at least two joints for allowing a movement of the backrest tubes between at least a first end position and a second end position; two locking means for locking and/or unlocking the joints; and a handle tube having only one handle for effecting the locking means to lock and/or unlock the joints, wherein the handle is arranged in the middle between the backrest tubes and is mechanically connected to the locking means via cables running substantially inside the hollow tubes to effect at least the unlocking of the locking means and the movement of the backrest tubes via the joints when gripped by one hand of an user, without releasing the respective grip of the handle, which is engineered to be effected by at least partly sliding, rotating, squeezing, pushing and/or pulling, and wherein the locking means automatically re-lock after effecting the unlocking of the joints and reaching the first or second end positions.

According to the invention it is preferred that each cable comprises a torsion cable, in particular steel torsion cable, and/or a Bowden cable, and/or each cable is connected to one locking means via an elastic element, in particular in form of a compression spring, being suited to be compressed or expanded within a predetermined range, in particular determined via at least one spring stop.

It is also proposed that at least two first joints allow the movement of the backrest tubes between the first end position and the second end position along a first direction and at least two second joints allow the movement of the backrest tubes between the second end position and a third end position along a second direction, wherein preferably the first and second direction are substantially different.

Embodiments of the invention can be characterized in that each first and/or second joint is configured to be adjustable, in particular to adjust the first, second and/or third end position(s), with each joint preferably comprising a plurality of connecting means, preferably in form of holes for at least one transverse screw, and/or stop means.

With the invention it is also proposed that each locking means comprises a wedge and/or provides an inclined, guiding plane, with preferably the at last one transverse screw being guided along the guiding plane during locking and/or unlocking of the locking means.

Backrest assemblies of the invention can be characterized by a trigger and a locking device, in particular comprising the elastic means, for locking and/or unlocking the handle.

It is proposed that the trigger is designed as or comprises at least one of a hull, a lever, a knob, a button, a latch, a strap, a clamp, a key, a switch and/or a sensor, preferably a force sensor, a tactile sensor, an optical sensor, a sound sensor and/or a fingerprint sensor, and/or is engineered to be effected by at least partly sliding, rotating, squeezing, pushing, pulling and/or touching.

With the invention it is also proposed that the locking device automatically re-locks the handle after the locking means re-locks.

According to the invention it is preferred that the handle is designed as or comprises at least one of a hull, a lever, a knob, a button, a latch, a strap and/or a clamp, preferably arranged in the middle between the backrest tubes.

Further embodiments of the invention are characterized in that the handle, in particular the hull, comprises two grip parts and/or at least two, preferably four, tension bolt parts connected to two handle tube parts, with each handle tube part being connected to one of the backrest tubes.

In this respect it also proposed that each tension bolt part has an end inserted into a handle tube part, and/or the tension bolt parts engage the cables, preferably via a rod to each end of which one cable is attached, with the rod in particular being encompassed and/or engaged by the tension bolt parts.

Still further, it is proposed that the grip parts are attached, and preferably releasably attached, to the tension bolt parts.

Embodiments of the invention can be characterized in that the handle comprises a sensor, preferably a force sensor, a tactile sensor, an optical sensor, a sound sensor and/or a fingerprint sensor.

With the invention it is further proposed that the handle tube and/or the handle comprises an indicator device for conveying information to the user, wherein preferably the indicator device comprises a display device with at least one light source for emitting light, in particular a LCD, a sound device with at least one loudspeaker for emitting sound, and/or a tactile device for generating a tactile perception.

Embodiments of the invention can be characterized in that the handle is adapted to move a device, in particular a seating surface of the chair, a seating frame of the chair, at least one leg, at least one rest, such as a footrest or a legrest, and/or at least one wheel of the chair and/or a linking system, in particular a modular linking system.

In this respect it is preferred, that the backrest assembly comprises a connection portion being in mechanical, optical and/or electrical operative connection with the handle for transferring the activation of the handle to the device.

Further preferred backrest assemblies of the invention are characterized by at least an actuator, in particular comprising a battery, a motor, an electric actuator, preferably an electric motor, a hydraulic actuator, preferably a hydraulic motor, a pneumatic actuator, preferably a pneumatic motor, a thermal actuator, a shape memory alloy, preferably a thermal and/or magnetic shape memory alloy, a mechanical actuator and/or a valve for actuating and/or controlling the movement of the backrest and/or the device.

Various aspects of this invention will become apparent to those skilled in the art from the following detailed description of the preferred embodiment, when read in light of the accompanying drawings.

BRIEF DESCRIPTION OF THE DRAWINGS

FIG. 2A is a perspective and partly phantom view of a backrest frame with a handle according to a second embodiment of the invention.

FIG. 2C is a part phantom view of the second embodiment.

DETAILED DESCRIPTION OF THE PREFERRED EMBODIMENT

Figure 1A:
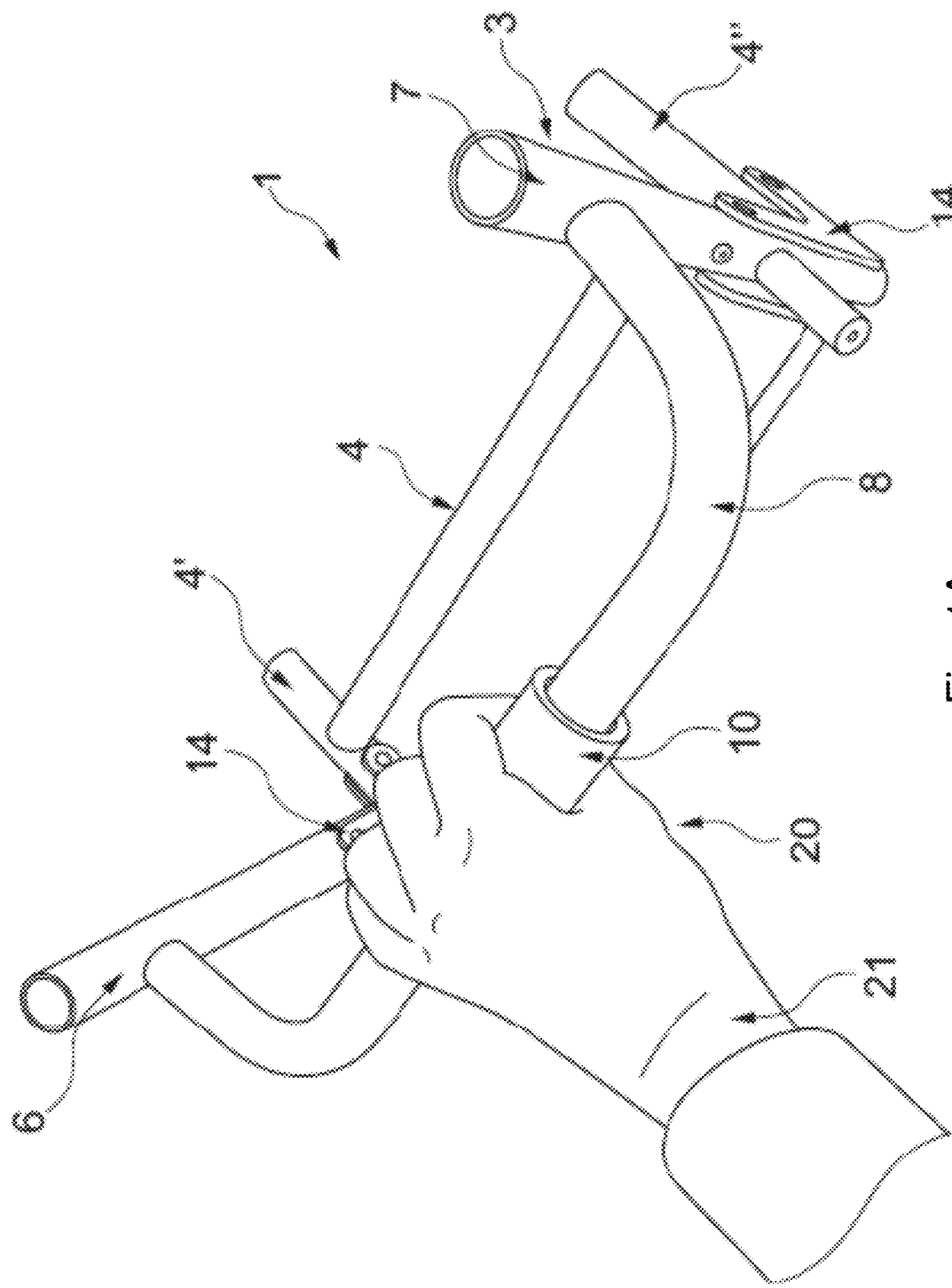
FIGS. 1A-1E are perspective views of a backrest frame with a handle according to a first embodiment of the invention.
Figure 1B:
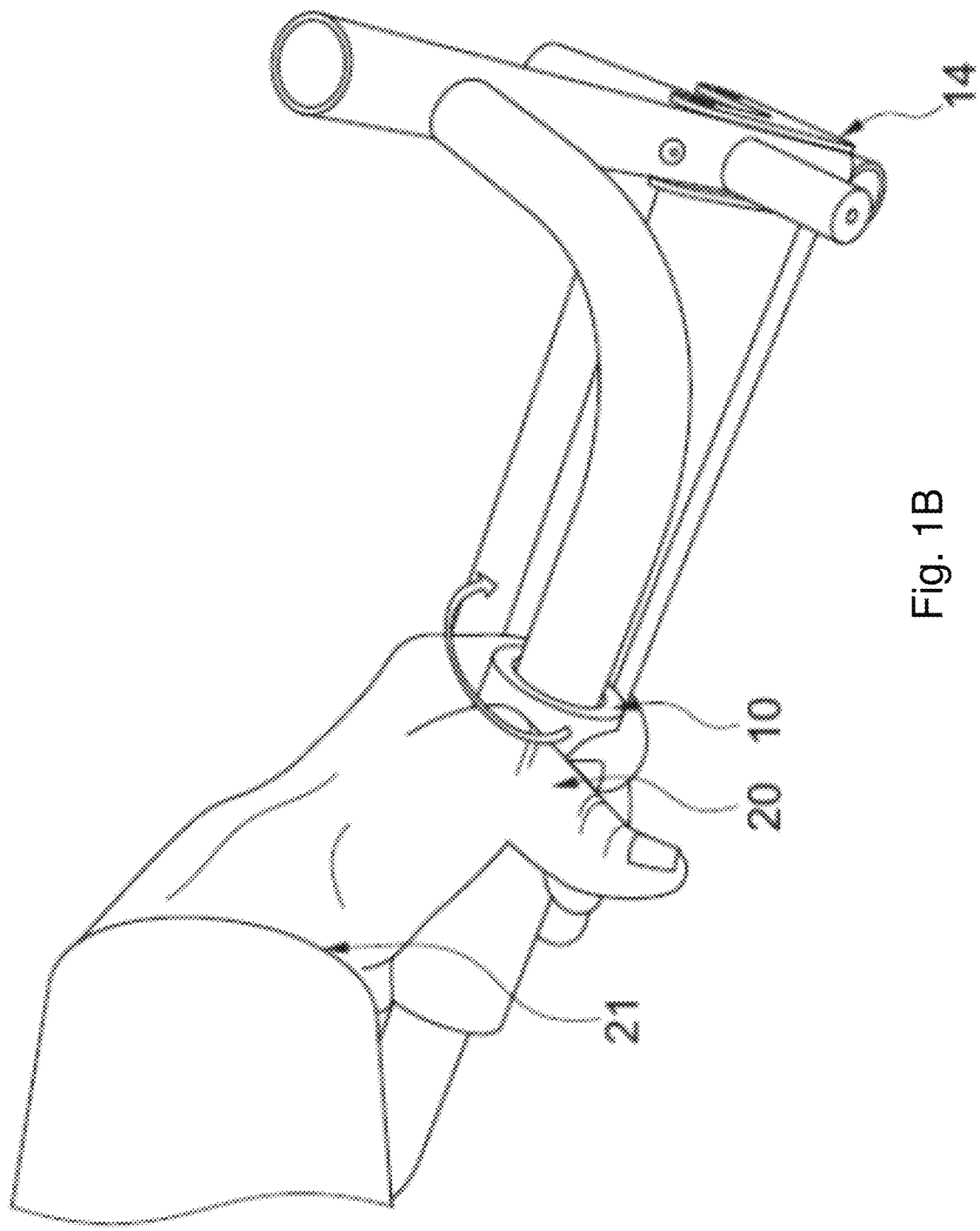

Referring now to the drawings, there is illustrated in FIGS. 1A to 1E a seat frame part 1 comprising a seating frame 4 as well as a backrest assembly according to a first embodiment of the invention having a backrest frame 3 and a handle 10. For sake of clarity, cushions, textile sheets and other design features of the seat have been removed, such that only a part of the naked frame can be seen. The shown seat frame part 1 is constructed from substantially hollow tubes, such that not shown cables, like Bowden cables, can run inside the tubes. A seat of a wheelchair comprises at least the backrest assembly and a seating surface. The seating surface is located between seating tubes 4' and 4".

The back of a person using a wheelchair with the backrest assembly will typically lean against a cushion, textile sheet and/or any other suitably designed backrest plate of the backrest which is positioned between and attached to a left backrest tube 6 and a right backrest tube 7. The left and right backrest tubes 6, 7 are connected via a handle tube 8, running behind the backrest plate. In FIGS. 1A to 1E, the handle tube 8 is connected to the left and right backrest tubes 6, 7 via a welded joint. The handle 10 is located in the center region of handle tube 8. The handle 10 encloses a part of the handle tube 8 and is adapted to rotate around the handle tube 8. Inside the handle 10 are mechanics for converting a rotation of the handle 10 into a force on a cable, running inside the hollow frame tube 8 from the handle 10 to locking means (not shown) of joints 14. The joints 14 form a junction between the backrest assembly and the seating surface of the seat frame part.

When the backrest tubes 6, 7 are in the upright position, as shown in FIG. 1A, the backrest assembly is in a first end position, i.e. the unfolded state. In FIGS. 1A to 1E a hand 20 of a user is also depicted. While in FIG. 1A the hand 20 grips the handle 10, in FIG. 1B the user has rotated the handle 10 by rotating the wrist 21 of his hand 10 in the downward direction. By rotating the handle 10 in this way, the locking means is effected for unlocking the joints 14 and allowing a movement of the backrest assembly around an axis running through the joints 14.

Figure 1C:
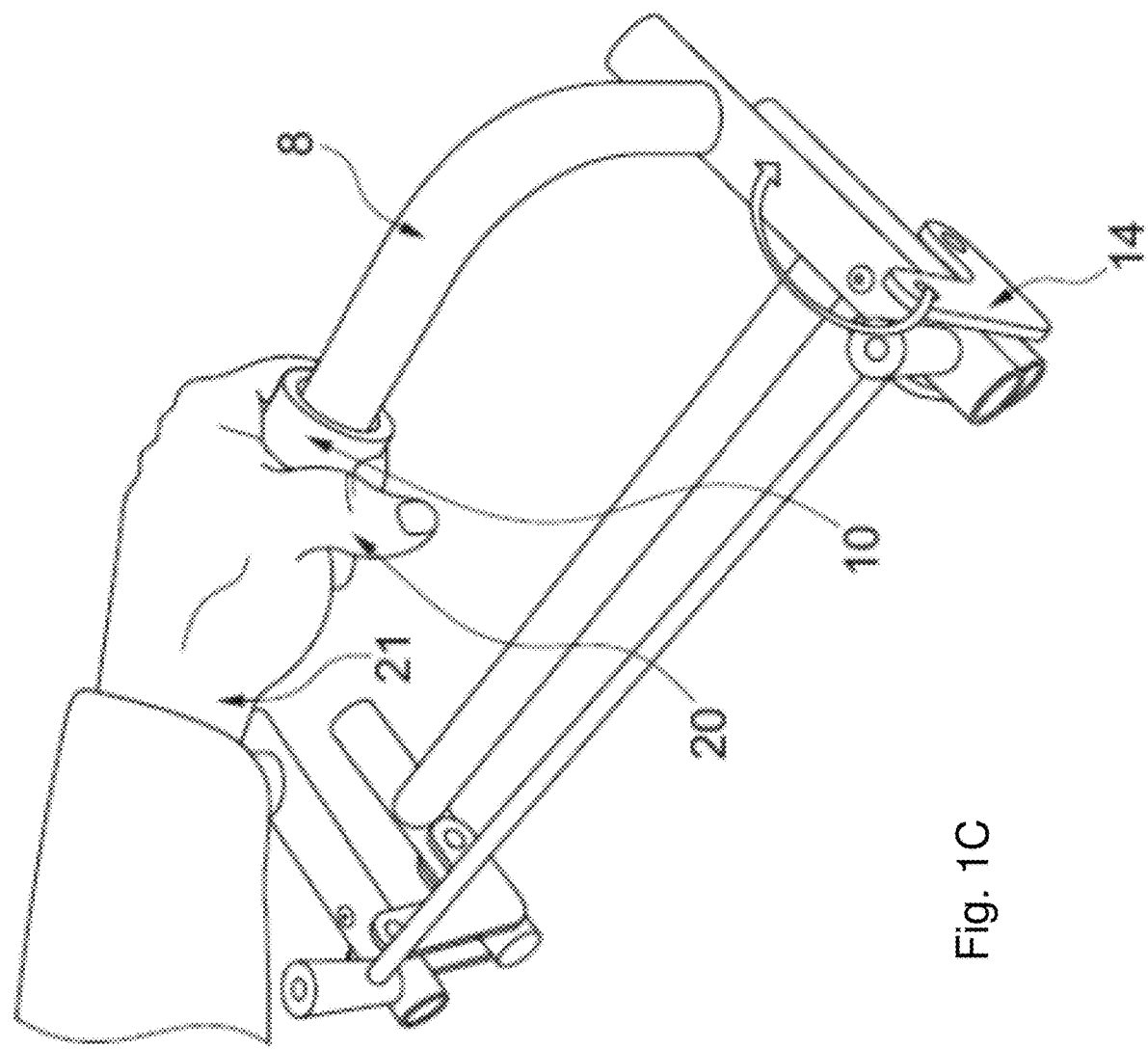

As can be seen in FIG. 1C, by moving his arm the user can rotate the backrest frame 3 around the joints 14 to fold the backrest assembly towards the seating surface. In a second end position, i.e. the folded state, the backrest plate (not shown) between the left and right backrest tubes 6, 7 is substantially parallel to the seating surface, and, respectively, the left and right backrest tubes 6, 7 are substantially parallel to the seating tubes 4', 4". The wrist 21 of the user can naturally return to an essentially straight configuration during the movement of his arm. When the backrest assembly reaches the second end position, the locking means automatically re-locks the joints 14 such that the backrest assembly cannot be unfolded by just pulling on handle tube 8. Therefore the user can unlock the locking means and fold the backrest without releasing his grip of the handle 10.

Figure 1D:
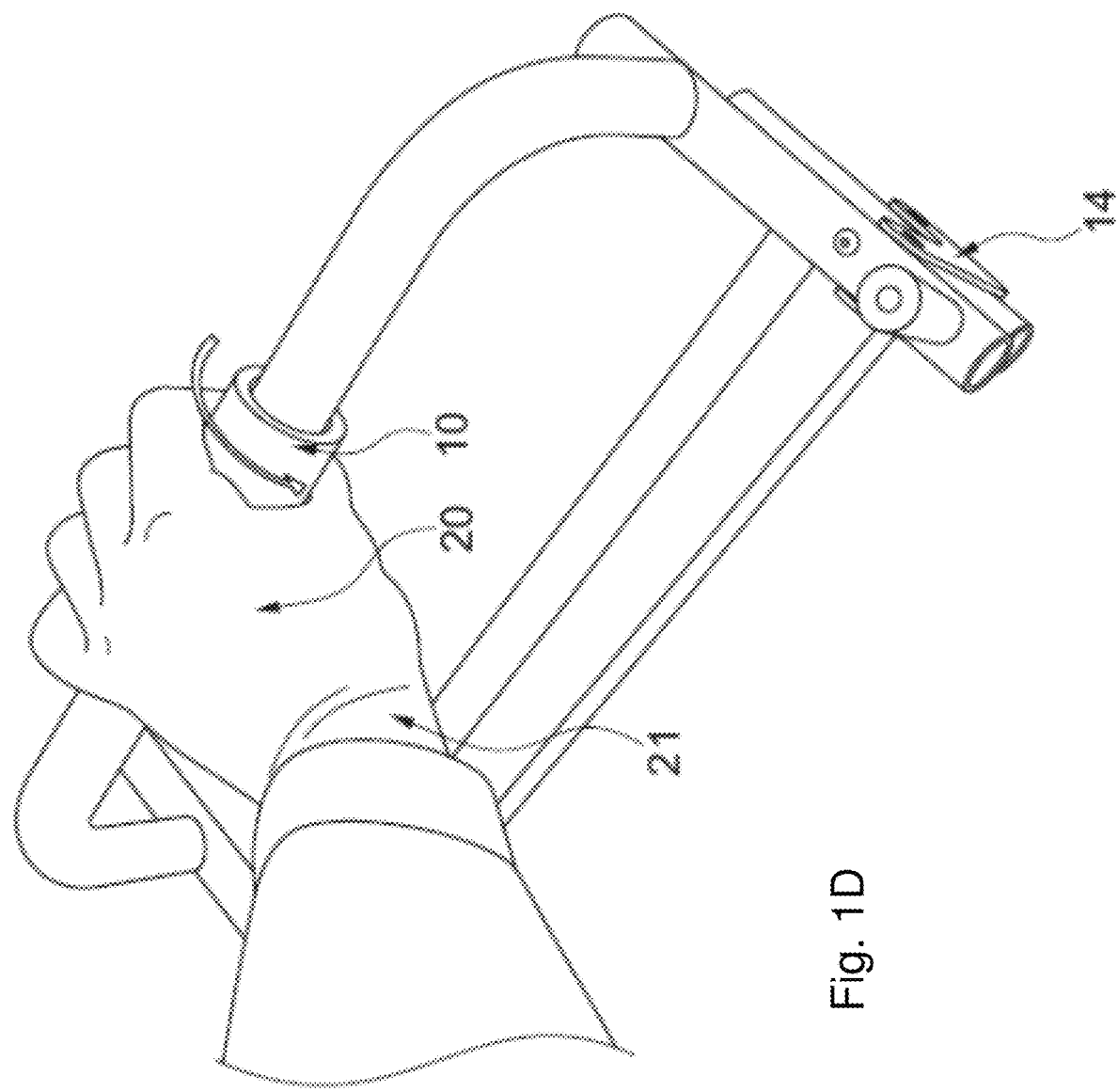
Figure 1E:
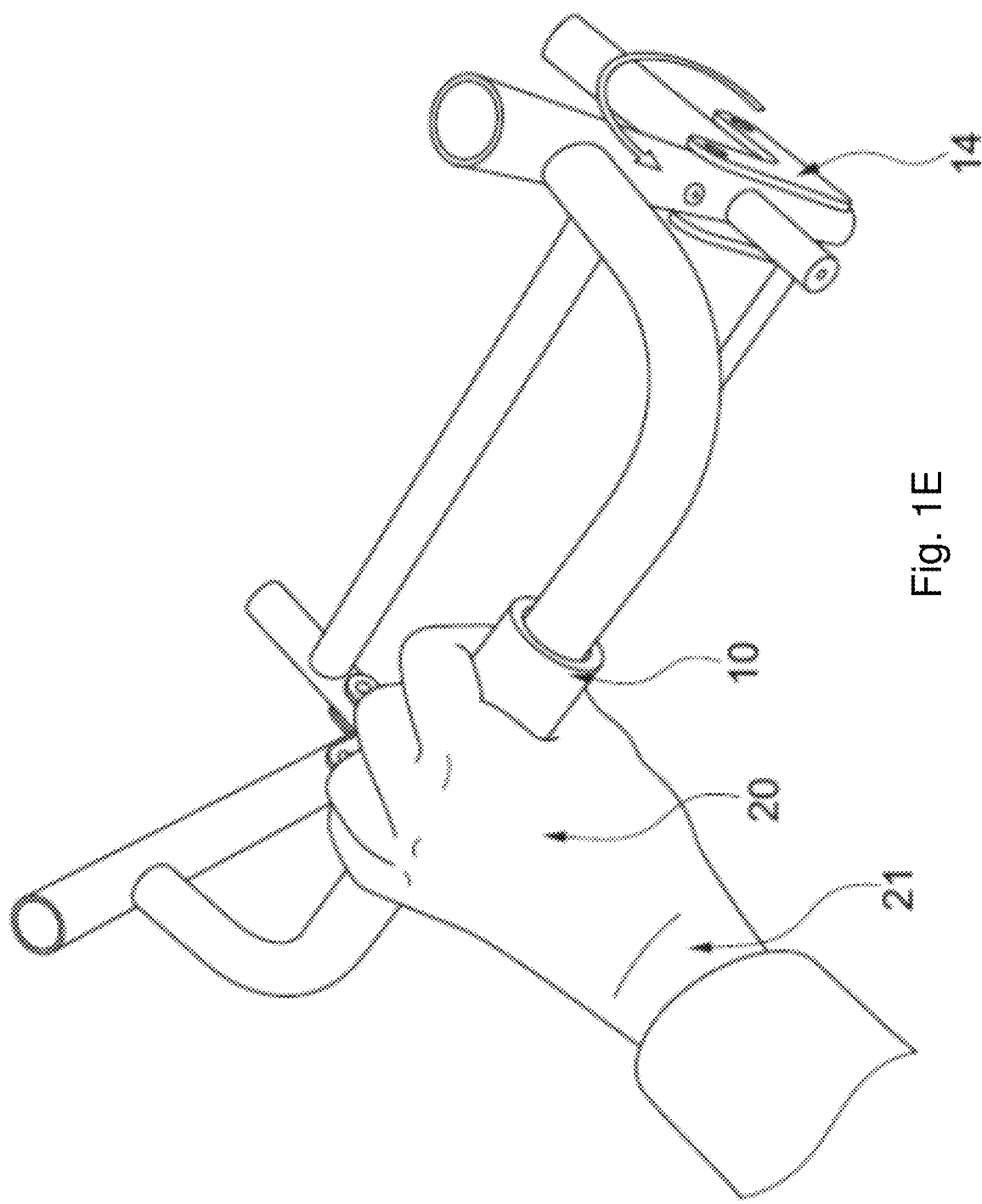

When the user wants to unfold the backrest assembly again, he only needs to rotate the handle 10 again. As shown in FIG. 1D, this can be realized by rotating the wrist 21 upwards, in the direction opposite to the first rotation. By moving his arm, the user can now rotate the backrest frame 3 around joints 14, see FIG. 1E, to unfold the backrest assembly again. When reaching the first end position, the locking means automatically re-locks the joints 14, such that the backrest assembly cannot be folded just by pushing the handle tube 8. Therefore the user can unlock the locking means and unfold the backrest without releasing his grip of the handle 10. In summary, the user can unlock the locking means, fold the backrest, unlock the locking means, and unfold the backrest without releasing the grip of his hand and, thus, his grip of handle 10.

Although the rotation directions of the wrist is described as upwards and downwards for unlocking the locking means in first and second end positions, respectively, the directions can also be reversed or equal for both unlocking actions.

A second embodiment of the backrest assembly according to the invention will be described in the following with reference to FIGS. 2A-2C. As can be seen from the perspective part phantom view of FIG. 2A, this alternative backrest assembly comprises a left backrest tube 60, a right backrest tube 70 with a handle tube 80 arranged therebetween. All of the tubes 60, 70, 80 are hollow to house additional elements of the backrest assembly, which will be discussed below.

The backrest tubes 60, 70 are connected via back brackets 90 acting as joints to a not shown seat. A handle 100 is arranged in the middle between the left backrest tube 60 and the right backrest tube 70 on the handle tube 80.

Figure 2B:
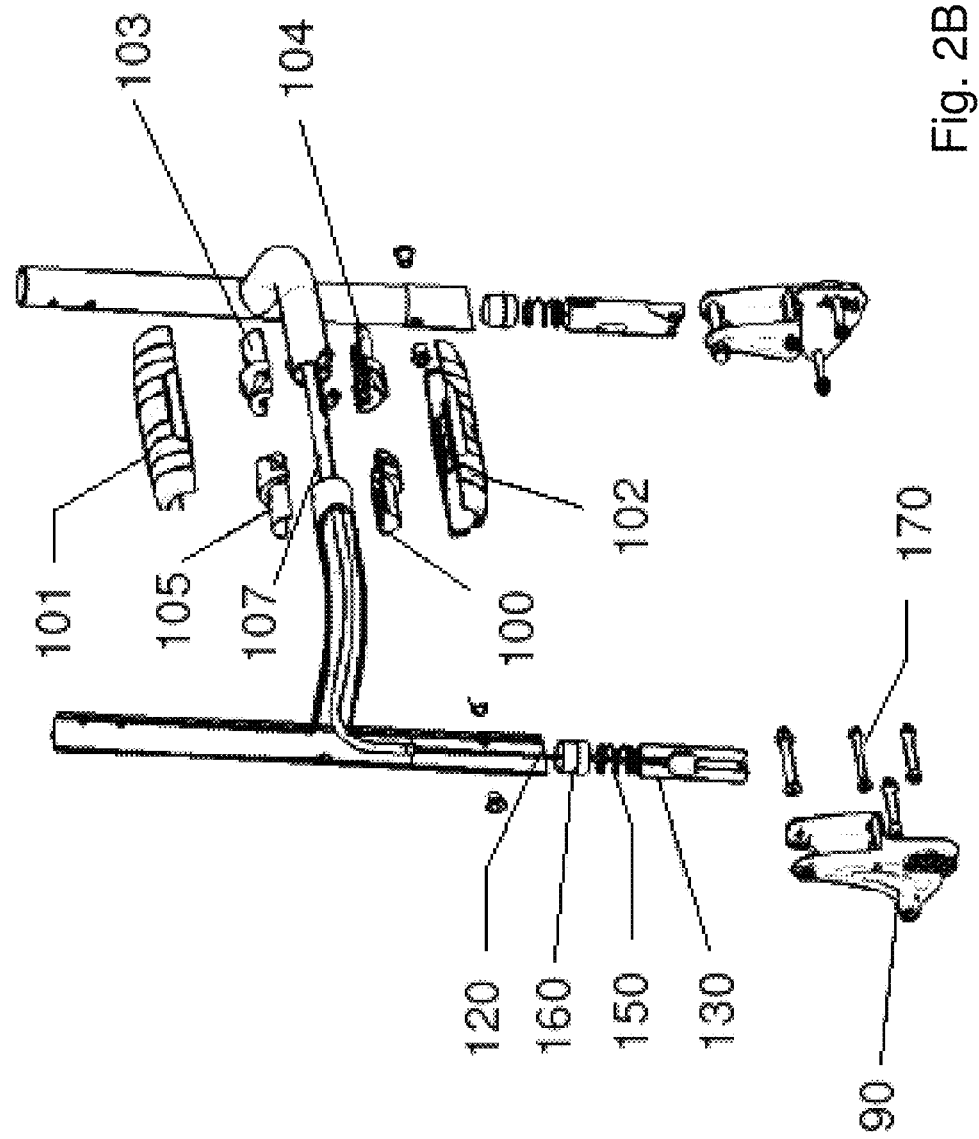
FIG. 2B is an exploded and partly phantom view of the second embodiment.

In particular from FIGS. 2A and 2B it can be seen that the handle tube 80 comprises two substantially L-shaped parts connected via a metal rod 107. Said metal rod 107 extends into each of the handle tube parts with its ends, and each of said metal rod ends is connected to a steel torsion cable 120 extending from said rod 107 through the respective handle tube part and backrest tube. Each steel torsion cable 120 is connected to a spring stop 160 for a compression spring 150 arranged between said spring stop 160 and a locking wedge 130 acting as locking means.

The locking wedges 130 can translate within their respective backrest tube 60, 70 and extend from said backrest tube 60, 70 into the backrest brackets 90. On each side of the backrest assembly one locking wedge 130 extends into one back bracket 90 and is locked via a transverse screw 170 extending through opposite holes 92 within the back bracket 90 in the upright, first position of the backrest tubes 60, 70 being the unfolded state of the backrest assembly.

The back brackets 90 each comprise a plurality of further holes 91, preferably seven holes, for further transverse screws 170 allowing the attachment of the backrest tubes 60, 70 with different inclinations to the seat. This enables an adjustment of the upright first end position of the unfolded backrest assembly. This position is automatically locked via the compression springs 150.

By rotating the metal rod 107 and, thus, moving the steel torsion cables 120 the compression springs 150 can be compressed such that the locking wedges 130 move along at least one transverse screw 170 until extending above said screw and therefore not being locked anymore. As soon as the locking wedges 130 have passed the transverse screws 170 locking the same the backrest assembly can be folded as described with respect to the first embodiment, in order to reach a second end position.

Turning now to FIG. 2B again, the construction of the handle 100 is explained. Said handle 100 comprises four tension bolt halves 103-106, two of which are to be partly inserted into each handle tube part and encompass the metal rod 107. The connection between the tension bolt halves 103-106 with the metal rod 107 can be secured by screws and the like resulting in that a rotation of the tension bolt halves 103-106 will result in a rotation of the metal rod 107.

Two gripping halves 101, 102 are attached to the four tension bolt half 103-106 to provide an optically pleasing and ergonomic gripping region.

Figure 3A:
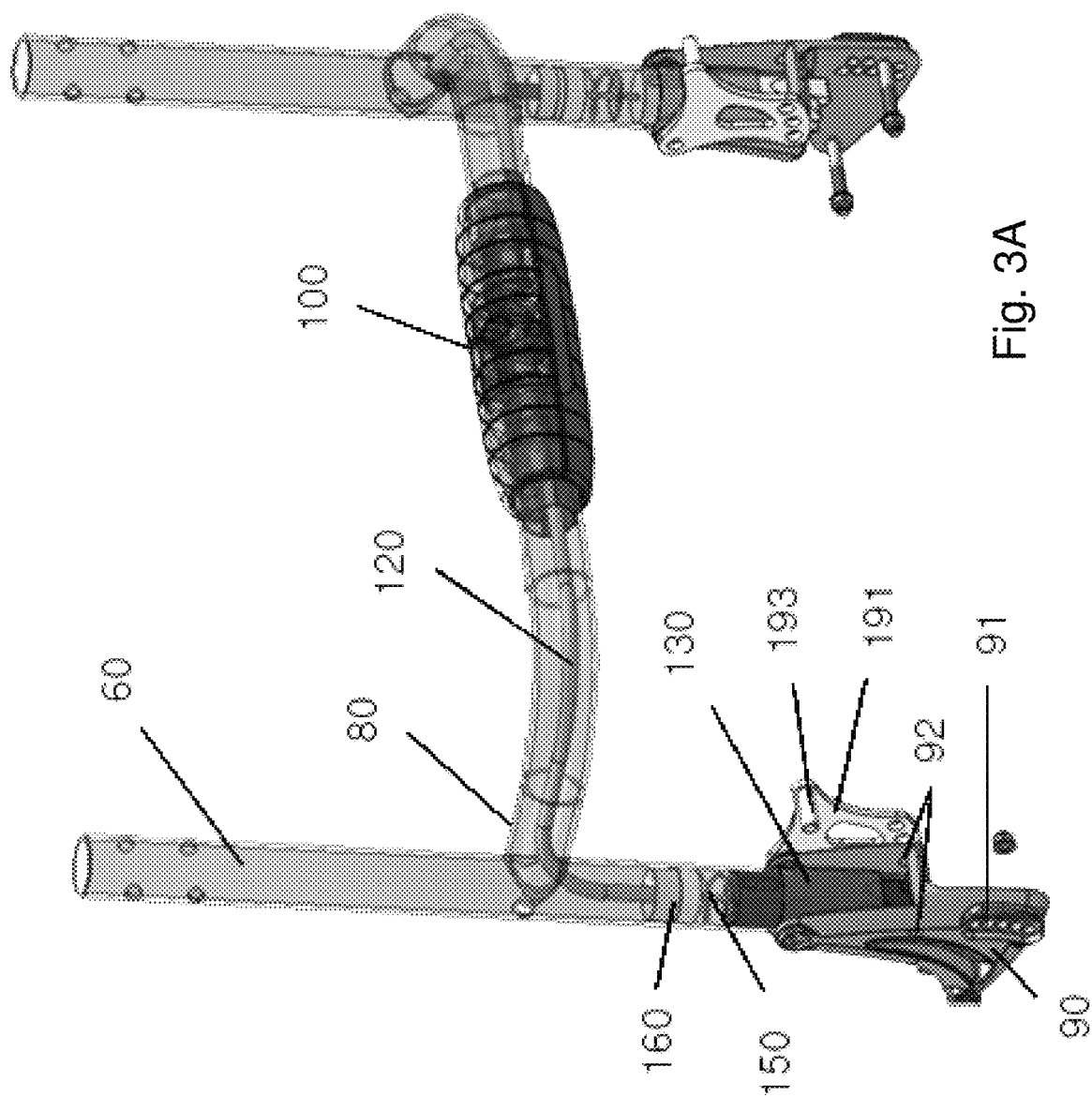
FIG. 3A is a perspective and partly phantom view of a backrest frame with a handle according to a third embodiment of the invention.
Figure 3B:
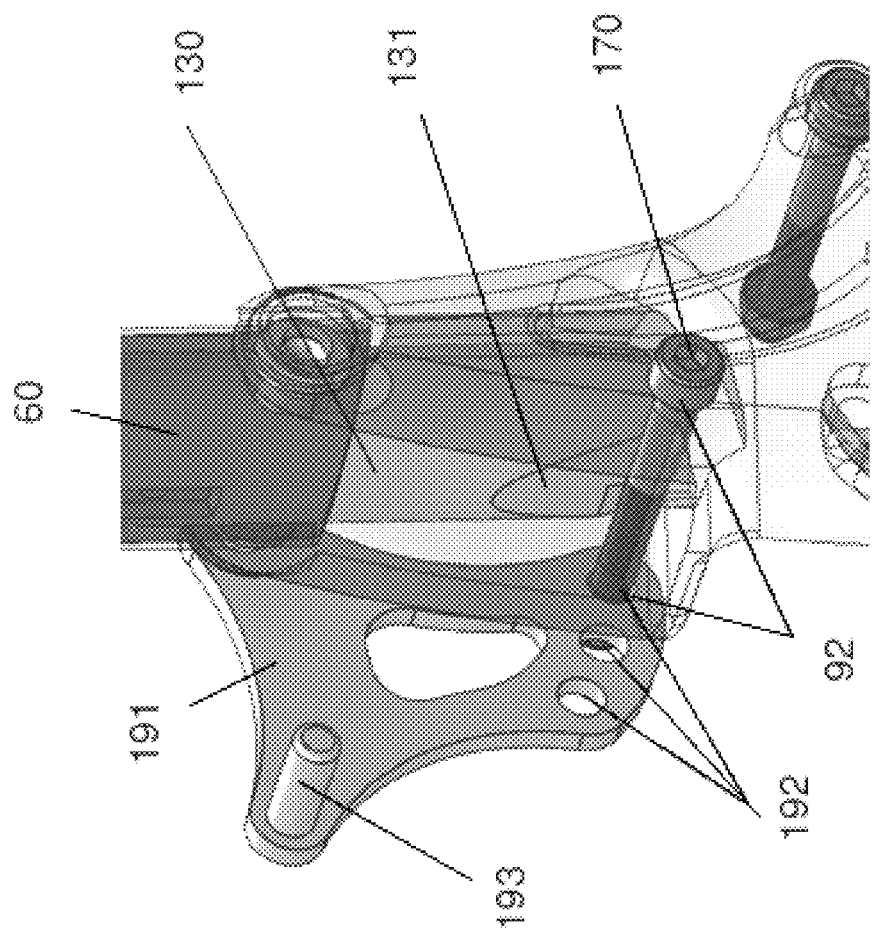
FIG. 3B is a part phantom view of the third embodiment.

With respect to a third embodiment of the backrest assembly of the invention, which is shown in FIGS. 3A and 3B, the locking and unlocking mechanism is further described.

In line with the second embodiment the third embodiment comprises steel torsion cables 120 between a metal rod 107 in the region of the handle 100 and locking wedges 130. Each wedge 130 can telescope with a respect backrest tube 60, 70 due to the arrangement of a compression spring 150 between the locking wedge 130 and a spring stop 160.

Each locking wedge 130 provides an inclined guiding plane 131 along which a transverse screw 170 passing through opposite holes 92 within the bracket 90 and one of the holes 102 provided by a back plate 191 as shown in FIG. 3B. When rotating the metal rod 107 and, thus, compressing the springs 150 via the force applied by the cables 120, the locking wedges 130 move upwards in FIG. 3*a* along the transverse screw 170 guided by the guiding plane 131 until passing the same and being unlocked allowing for rotation of the backrest tubes 60, 70 until the locking wedges 130 each abut against a wedge stop 193 provided by the back plate 191.

In order to ensure a substantially parallel arrangement of the backrest tubes 60, 70 and a not shown seat in the folded, second position of the backrest assembly the back plate 191 is provided with three holes 192 for adjustment purposes. That is, the transverse screw 170 shown in FIG. 3B of said holes 192 to change the position of the wedge stop 193.

Thus, there are two possibilities for adjustment, namely an adjustment of the first position as well as an adjustment of the second position.

In another, not shown embodiment the handle on the backrest tube is of a different form and/or functionality. For example the handle can be designed as or comprise a hull, a lever, a knob, a button, a latch, a strap and/or a clamp. It can also comprise a sensor, in particular a force sensor, a tactile sensor, an optical sensor, a sound sensor, a fingerprint sensor, and/or any combinations thereof. The handle can be engineered to be effected by at least partly sliding, rotating, squeezing, pushing, pulling, touching, any other suitable type of force and/or movement and/or any combinations thereof.

Additionally of using cables to transmit a mechanical force to the locking means, cables for transmitting electrical or optical signals and/or a wireless connection, in particular a Bluetooth or a WLAN connection, can also be used. The signals can effect the locking means leading to a locking and/or unlocking of the joints and/or a movement of the backrest assembly, in particular a movement of the backrest tubes, such as a folding or an unfolding movement. Especially an actuator, comprising a battery, a motor, an electric actuator, such as an electric motor, a hydraulic actuator, such as a hydraulic motor, a pneumatic actuator, such as a pneumatic motor, a thermal actuator, a shape memory alloy, especially a thermal and/or magnetic shape memory alloy, a mechanical actuator, a valve, any other suitable actuator for actuating and/or controlling the locking means and/or the movement of the backrest, in particular the backrest tube, and/or the wheelchair as a whole. The actuator can be designed to support the user, thereby reducing the force needed to be applied by the user and/or to perform the locking and/or unlocking of the joints and/or the movement of the backrest assembly without the support from the user, thereby dispensing the need of the user to apply a force.

The rotation of the handle, i.e. the effecting of the locking means, can also be locked by a locking device or locking release device, such that the handle cannot rotate unintendedly. The locking device secures against the unintended effecting of the locking means and has a trigger. The trigger can comprise a form similar to the handle for effecting the locking means, but also other forms can be used. For example, a push button on the handle or a squeezing portion on the handle can be provided. Only when pushing the push button or squeezing the squeezing portion the locking device allows a movement of the handle for effecting the locking means. The trigger is advantageously located on or near the handle such that the user can effect the trigger and the handle with one single hand and without releasing the grip of the handle.

The backrest assembly described above comprises two backrest tubes, the left and right backrest tubes which are connected via the two joints with the seat. It is also possible that a single backrest tube, preferably located centrally between the substituted left and right backrest tubes and a single joint is used to connect the backrest assembly to the seat. A handle tube running behind the backrest plate of the backrest assembly either in horizontal or vertical direction can then be used to connect to the single backrest tube and effect the locking means of the single joint of the single backrest tube, blocking and/or unblocking a movement of the backrest assembly via the joint, in particular a folding of the backrest plate towards the seating surface.

Alternatively, by using a single backrest tube and a joint, the backrest of the backrest assembly can also be rotated substantially about 90° around a vertical rotation axis to minimize the width of the backrest assembly. By additionally employing a second joint or by the joint being provided with the ability to facilitate the folding in two directions, the vertically rotated backrest assembly can be additionally rotated around a horizontal axis to fold the backrest assembly between the rear legs of the seat and/or the rear wheels of the wheelchair (both not shown). By additionally folding the seating surface, the total width of the seat and/or wheelchair can be further reduced.

In particular it is envisaged according to the invention that the handle for unlocking and moving the backrest can also comprise additional functions. For example, after the backrest reaches the second end position, for example the folded state, the handle can be further used to effect another locking means and/or the movement of a another device. This device can be part of the chair, in particular of the wheelchair, or an external device. For example, the handle can effect a locking means for unlocking a joint for folding the seating surface of the chair, the seating frame, one or more legs and/or wheels and/or a linking system, in particular a modular linking system of the wheelchair.

In this way the user can, for example, unlock a first locking means, fold the backrest, unlock a second locking means, and fold a device, such as the seating frame, without releasing the grip of his hand on the handle. In particular the user can unlock a first locking means, fold the backrest, unlock a second locking means, fold the device, such as the seating frame, unlock the second locking means, unfold the device, such as the seating frame, unlock the first locking means and unfold the backrest, without releasing his grip of the handle. Especially, it is envisaged that the handle can effect more than two locking means of the wheelchair. In this way the wheelchair can be folded multiple times to reduce the overall size. Naturally, the directions of the movement of the handle and/or folding and/or the type of action for effecting the handle and/or the locking means can change between different steps.

Linking systems in general and especially modular linking systems allow a flexible and easy positioning of components in three dimensional space. It refers in particular to a modular linking system with at least one linking module and at least one link to be connected therewith, wherein the linking module comprises a module body, a locking means, and at least one joint. The mechanical connection of the linking module to the wheelchair can be provided at a connection portion of the wheelchair comprising a locking means and/or a joint which can be in operative connection with the handle for transferring the activation of the handle to the linking system and/or the locking means of the linking system. Besides being mechanically connected to the chair, especially to the wheelchair, the linking system can also be electronically or optically connected to the chair, either via a cable or wirelessly.

In a similar manner, other devices can be connected to the connection portion of the chair, in particular to a connection portion of the backrest assembly, being in operative connection with the handle for effecting the device and/or the locking means of the device when using the handle. Besides being mechanically connected to the chair, especially to the wheelchair, the device can also be optically or electronically connected to the chair. The actuator can also be used in conjunction with the device, a locking means of the device and/or a joint of the device.

The backrest assembly, in particular the handle tube and/or the handle, can additionally comprise an indicator device which may comprise a display device with at least one light source for emitting light, a sound device, with at least one loudspeaker for emitting sound, and/or a tactile device for generating a tactile perception. The indicator device can be used to convey information, especially signify the status of the chair, preferably of the wheelchair, showing the status of, for example, its position, direction, load, velocity and/or acceleration, the status of the handle, the status of the trigger, the status of the one or more locking means, the status of the locking device, the status of the one or more joints, the status of the one or more actuators, the charging status of at least one battery, and/or the status of the one or more other devices to the user.

A simple example of such an indicator comprises a light source adapted to emit a green and a red light. When a device, such as the backrest, is in the first end position and secured against a movement, the indicator device can emit a red light in a specific form, for example continuously, when the hand of the user approaches the handle or when a user touches the handle. This signifies that the device is secured against a movement. When effecting the handle for changing the status of a locking means of the device from locked to unlocked, the indicator device can change the emission mode of the light source from emitting continuously to a pulsed mode, such that the red light flashes during the transition period. When reaching the end point of the transition period, the indicator device can emit a green light to signify that the locking means has been successfully effected by the handle and a movement can now begin. During the movement of the now unlocked device the indicator device can change the emission mode of the light source from emitting continuously to a pulsed mode, such that the green light flashes during the transition period. When reaching the second end position, the indicator device can again emit a continuous red light to signify that the device has been successfully secured against movement. The emission mode and the color of the emitted light specified here are only an example, one color or different colors can be used together or alone with differently timed emission modes.

Alternatively or additionally the indicator device can comprise a display device, preferably a display device in form of a liquid-crystal display (LCD), for conveying information to the user.

In a similar manner the other senses of a user can be addressed for conveying information to the user, for example the acoustic and/or the tactile sense. This allows for a largest possible configurability and freedom in customization of the handle to the abilities and the needs of the user.

Especially useful for users with a limited mobility and/or force is an embodiment of a chair, in particular a wheelchair, which uses a sensor for receiving a command from the user and an actuator for actuating the desired movement, for example the folding of the backrest, for the user.

Additionally, the chair, especially the wheelchair, can then give some feedback of the movement and/or the status of the chair, especially of the wheelchair, to the user via the indicator device.

Although the joint for effecting the movements is here described as effecting rotational movements, linear movements and/or displacements can also be effected with such a joint and is comprised in all embodiments of the present invention.

The principle and mode of operation of this invention have been explained and illustrated in its preferred embodiment. However, it must be understood that this invention may be practiced otherwise than as specifically explained and illustrated without departing from its spirit or scope.

What is claimed is:
1. A backrest assembly of a wheelchair seat having a seating frame comprising tubes, the backrest assembly comprising:
   a backrest for supporting the back of a person;
   two hollow backrest tubes connecting the backrest to the seat on each side of the seat;
   at least two joints for allowing a movement of the two hollow backrest tubes between at least a first end position and a second end position wherein the at least two joints are at least two first joints allowing the movement of the two hollow backrest tubes between the first end position and the second end position along a first direction and at least two second joints allowing the movement of the backrest tubes between the second end position and a third end position along a second direction, wherein the first and second directions are substantially different;
   two locking means for locking and/or unlocking the joints; and
   a hollow handle tube having only one handle for effecting the locking means to lock and/or unlock the joints, wherein the handle is arranged in the middle between the backrest tubes and is mechanically connected to the locking means via cables running inside at least a portion of the two hollow backrest tubes to effect at least the unlocking of the locking means and the movement of the backrest tubes via the joints when gripped by one hand of a user, without releasing the respective grip of the handle, the handle being configured to be effected by at least partly sliding, rotating, squeezing, pushing and/or pulling, and wherein the locking means automatically re-locks after effecting the unlocking of the joints and reaching the first or second end positions.

2. The backrest assembly according to claim 1, wherein each cable comprises a torsion cable, and/or a Bowden cable, and/or each cable is connected to one locking means via one of an elastic element or a compression spring being suited to be compressed or expanded within a predetermined range as a function of at least one spring stop.

3. The backrest assembly according to claim 2, wherein the handle is coupled to a trigger and a locking device comprising the elastic element or the compression spring for locking and/or unlocking the handle.

4. The backrest assembly according to claim 3, wherein the trigger is configured as at least one of a hull, a lever, a knob, a button, a latch, a strap, a clamp, a key, a switch or a sensor, the sensor being at least one of a force sensor, a tactile sensor, an optical sensor, a sound sensor or a fingerprint sensor, and/or the trigger is configured to be effected by at least partly sliding, rotating, squeezing, pushing, pulling or touching.

5. The backrest assembly according to claim 3, wherein the locking device automatically re-locks the handle after the locking means re-locks.

6. The backrest assembly according to claim 1, wherein each first and/or second joint is configured to be adjustable to vary the first, second and/or third end position(s), with each joint comprising a plurality of connecting holes for at least one transverse screw and/or stop means.

7. The backrest assembly according to claim 1, wherein each locking means comprises a wedge and/or provides an inclined, guiding plane, with the at last one transverse screw being guided along the guiding plane during locking and/or unlocking of the locking means.

8. The backrest assembly according to claim 1, wherein the handle is configured as at least one of a hull, a lever, a knob, a button, a latch, a strap or a clamp, arranged in the middle between the backrest tubes.

9. The backrest assembly according to claim 8, wherein the handle is configured as the hull and comprises two grip parts and/or at least two tension bolt parts connected to two handle tube parts, with each handle tube part being connected to one of the backrest tubes.

10. The backrest assembly according to claim 9, wherein each tension bolt part has an end inserted into a handle tube part, and/or the tension bolt parts engage the cables via a rod to each end of which one of the cables is attached, with the rod being encompassed and/or engaged by the tension bolt parts.

11. The backrest assembly according to claim 9, wherein the two grip parts are releasably attached to the tension bolt parts.

12. The backrest assembly according to claim 1, wherein the handle comprises a sensor configured as at least one of a force sensor, a tactile sensor, an optical sensor, a sound sensor or a fingerprint sensor.

13. The backrest assembly according to claim 1, wherein the handle tube and/or the handle comprises an indicator device for conveying information to the user, the indicator device comprising a display device with at least one light source for emitting light, a sound device with at least one loudspeaker for emitting sound, or a tactile device for generating a tactile perception.

14. The backrest assembly according to claim 1, wherein the handle is adapted to move a device configured as at least one of a seating surface, a seating frame, at least one rest, at least one wheel, or a linking system.

15. The backrest assembly according to claim 14, further comprising a connection portion being in at least one of a mechanical, optical or electrical connection with the handle for transferring the activation of the handle to the device.

16. The backrest assembly according to claim 14, further comprising at least an actuator comprising at least one of an electric actuator, an electric motor, a hydraulic actuator, a hydraulic motor, a pneumatic actuator, a pneumatic motor, a thermal actuator, a shape memory alloy configured as a thermal and/or magnetic shape memory alloy, or a mechanical actuator, and/or a valve for actuating and/or controlling the movement of the backrest and/or the device.

17. The backrest assembly of claim 1 mounted to the wheelchair.

18. A backrest assembly of a wheelchair seat having a seating frame comprising tubes, the backrest assembly comprising:
a backrest for supporting the back of a person;
two hollow backrest tubes connecting the backrest to the seat on each side of the seat;
at least two joints for allowing a movement of the two hollow backrest tubes between at least a first end position and a second end position;
two locking means for locking and/or unlocking the joints, each locking means comprises a wedge and/or provides an inclined, guiding plane, with the at last one transverse screw being guided along the guiding plane during locking and/or unlocking of the locking means; and
a hollow handle tube having only one handle for effecting the locking means to lock and/or unlock the joints, wherein the handle is arranged in the middle between the backrest tubes and is mechanically connected to the locking means via cables running inside at least a portion of the two hollow backrest tubes to effect at least the unlocking of the locking means and the movement of the backrest tubes via the joints when gripped by one hand of a user, without releasing the respective grip of the handle, the handle being configured to be effected by at least partly sliding, rotating, squeezing, pushing and/or pulling, and
wherein the locking means automatically re-locks after effecting the unlocking of the joints and reaching the first or second end positions.

19. The backrest assembly according to claim 18, wherein each cable is connected to one locking means via one of an elastic element or a compression spring being suited to be compressed or expanded within a predetermined range as a function of at least one spring stop;
the handle is coupled to a trigger and a locking device comprising the elastic element or the compression spring for locking and/or unlocking the handle; and
the locking means automatically re-locks the handle after the locking means re-locks.

20. A backrest assembly of a wheelchair seat having a seating frame comprising tubes, the backrest assembly comprising:
a backrest for supporting the back of a person;
two hollow backrest tubes connecting the backrest to the seat on each side of the seat;
at least two joints for allowing a movement of the two hollow backrest tubes between at least a first end position and a second end position;
two locking means for locking and/or unlocking the joints; and
a hollow handle tube having only one handle for effecting the locking means to lock and/or unlock the joints, wherein the handle is arranged in the middle between the backrest tubes and is mechanically connected to the locking means via cables running inside at least a portion of the two hollow backrest tubes to effect at least the unlocking of the locking means and the movement of the backrest tubes via the joints when gripped by one hand of a user, without releasing the respective grip of the handle, the handle being configured to be effected by at least partly sliding, rotating, squeezing, pushing and/or pulling, each cable is connected to one locking means via one of an elastic element or a compression spring being suited to be compressed or expanded within a predetermined range as a function of at least one spring stop, the handle is coupled to a trigger and a locking device comprising the elastic element or the compression spring for locking and/or unlocking the handle; and wherein the locking means automatically re-locks after effecting the unlocking of the joints and reaching the first or second end positions and the locking means automatically re-locks the handle after the locking means re-locks.

\* \* \* \* \*